May 22, 1956 P. O. DAHLMAN 2,747,018
IMPULSE CORRECTING REPEATER FOR AUTOMATIC TELEPHONE SYSTEM
Filed July 17, 1952
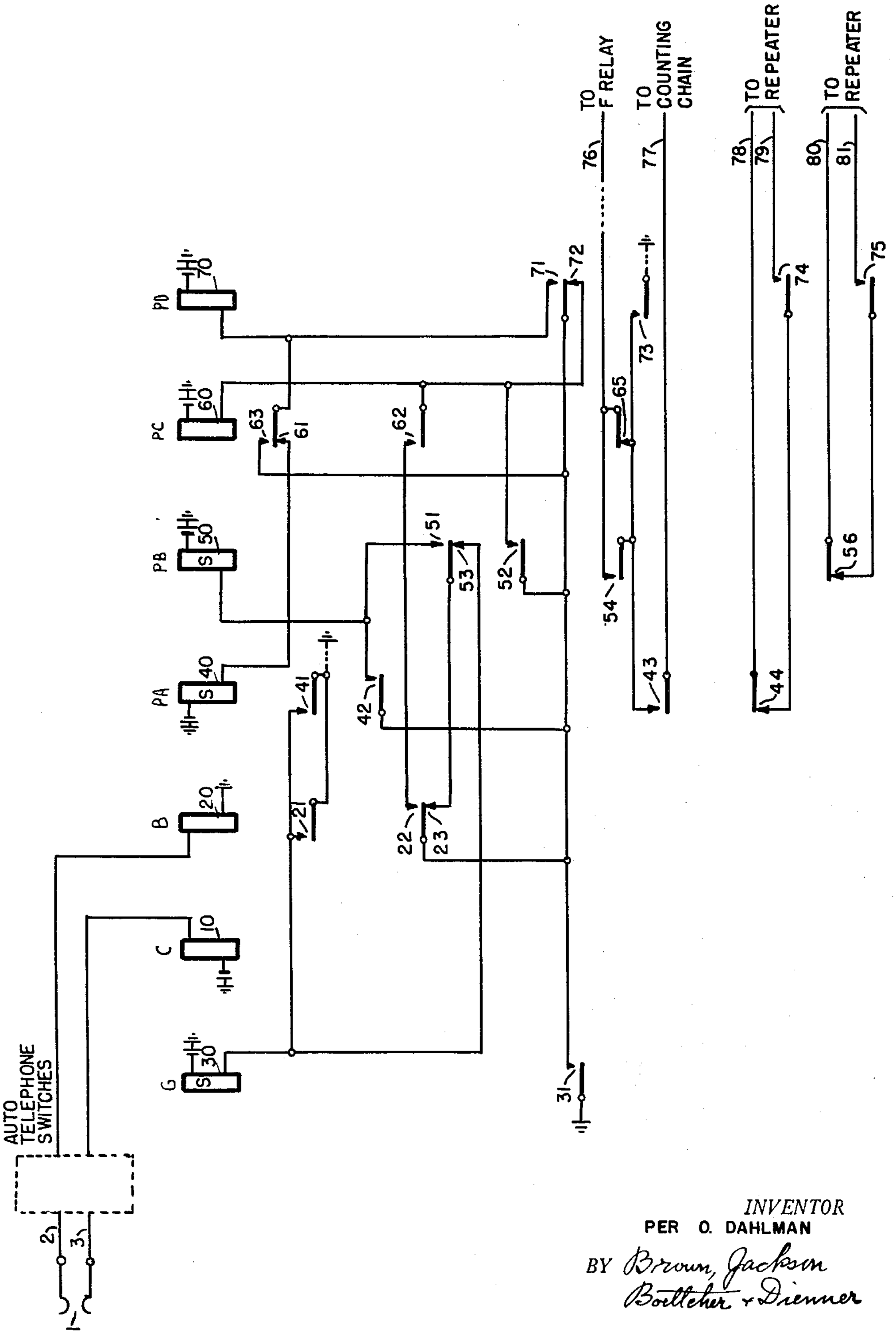
INVENTOR
PER O. DAHLMAN
BY Brown, Jackson
Boettcher & Dienner
ATTYS United States Patent Office 2,747,018

Patented May 22, 1956

2,747,018

IMPULSE CORRECTING REPEATER FOR AUTOMATIC TELEPHONE SYSTEM

Per Olaf Dahlman, Galion, Ohio, assignor to North Electric Company, a corporation of Ohio Application July 17, 1952, Serial No. 299,311

13 Claims. (Cl. 179—16)

The present invention relates in general to automatic telephone systems, and more particularly to a novel impulse correcting arrangement which is especially adapted for use with the various automatic switches of an automatic telephone exchange.

In most conventional types of automatic telephone exchange equipment each subscriber substation is equipped with an impulse transmitting device, such as a dial impulsing unit, which is adapted with registration thereon of the directory number of a desired party, to transmit corresponding groups of impulses over an associated line loop to a plurality of automatic switches which are centrally located in the exchange. The automatic switches are, in turn, operative with receipt of the incoming impulses to selectively seize the line having the directory number transmitted. A communication link between the called and calling parties is then completed by the switching equipment.

A primary requisite to the achievement of consistent operation is the establishment of a standard operating impulse for the automatic switches, the initial adjustment of the automatic switches to such standard, and the consistent supplying of the standard pulse to the switching apparatus. In the field today, therefore, the dial equipment is adjusted to respond to impulses having a break to make ratio of approximately 60–40% and having a rate of speed in transmission of 10 pulses per second.

Receipt by the switching equipment of impulses which vary to certain degrees in value from these standards will effect improper operation of the switches, and it is to the minimization of improper operation resulting from receipt of variable impulses that the present invention is directed.

Variations in the values of the impulses transmitted in an exchange are experienced most generally at three given points in the system, such points including the dial impulse generating mechanism at the subscriber substations, the line loop connecting the stations to the switches and the source of operating potential for the systems.

Variations in the impulse characteristics as generated at the substations are frequently experienced, for example, as a result of undue wear of the mechanical parts of the dial mechanism or the accumulation of dust and dirt on the working parts thereof.

Impulse distortion or variation may also occur in transmission as a result of high capacitance, high inductance, or high resistance which may exist in the line loop which interconnects the substations to the switching equipment.

Fluctuation of the value of the potential supply source may also cause improper response of the receiving equipment in the automatic switches.

There has been set forth in a copending application which was filed by Blackhall et al. February 26, 1951, and received S. N. 212,808 (now Patent 2,717,278) an impulse corrector which successfully minimizes improper response of the equipment should variations in the characteristics of the impulses be experienced.

Such apparatus is specifically operative to accept incoming impulses having variations in the described characteristics, and to provide, in response thereto, outgoing impulses of accepted characteristics. The apparatus in addition to being comparatively simple in structure, is extremely flexible in its adaptability and economical in use. The present invention is directed to a novel modification of the impulse corrector apparatus shown in the copending application, and specifically to an arrangement which is operative with the selector and repeating equipment of an automatic exchange, whereby such switching equipment is rendered, for all practical purposes, independent of large variations in dial speed, dial percentage, line loads, line lengths, and battery voltage.

In conventional selector equipment, a so-called "F" or transfer relay is arranged to be operated following the seizure of the switch preparatory to effecting switch transfer, the relay being held operated during receipt of the impulses representing the incoming digit, and being restored with termination of the digit to control extension of the calling line to the next switch. An operating circuit is completed to the "F" relay with each deenergization of the line relay, and the slow to release adjustment of the relay maintains it operated during the periods of energization of the line relay. It is apparent therefrom that if the line relay is maintained energized for an extra long period by an elongated make period, a short pulse is transmitted to the "F" relay, and the "F" relay may restore to effect operative switching. It is a specific object of this invention to provide an impulse corrector which under such circumstances will provide a pulse of greater length to the selector "F" relay than that which was provided by the structure of the aforesaid copending application. In this manner the possibility of faulty switching operation is further reduced.

A further feature of this application is the provision of a lengthened pulse, as compared with that provided by the apparatus of the copending application, to the selector "G" or holding relay. In this manner the equipment alleviates a critical release condition which the relay "G" approaches with the occurrence of long break periods.

It is a further object of hte invention to provide an impulse corrector which will provide a set of impulses over one output circuit which are of longer duration whenever the incoming impulse is elongated, and which is operative to provide a second set of impulses over a second output circuit which are consistently of a given length regardless of variations in the value of the incoming impulses. The second set of impulses thus provided are utilized to drive the selector counting chain, it being obvious that a more reliable switching operation is obtained with the provision of a standard impulse to a counting chain.

A further object of the invention is to provide an impulse corrector repeater having the foregoing arrangements which further includes a simplified circuit operative to repeat the impulse series without introducing an extra pulse upon release of the equipment. These and other features and advantages will be apparent with reference to the following specification, claims and accompanying drawing which teach the novel impulse corrector circuit in detail.

*General circuit description*

The impulse corrector arrangement of the invention basically comprises an input circuit over which the equipment is seized and to which the incoming impulses are applied; relay means which are operative responsive to seizure of the circuit to prepare outgoing circuits to associated switching equipment; and impulse generating means which generate and transmit corrected impulses of the desired characteristics over the outgoing circuits.

The input circuit for the pulse correcting repeater is controlled by the line relay 20 at its contacts 23, a normal input pulse being defined as the closure of contacts 22, 23 for 60% of each pulse.

While the term "length of pulse" technically refers to the length of a pulse cycle (i. e., at 10 pulses per second, the length of the pulse cycle is 100 milliseconds and at 8 pulses per second 125 milliseconds), for simplicity "length of pulse" or "pulse" is used to designate the off-normal period of a pulse cycle, i. e., the break period in a normally closed circuit or the make period in a normally open circuit.

The impulse generating means as controlled with receipt of impulses over the input circuit basically comprise a set of three timer relays, one of which relays (60) is energized on seizure of the impulse corrector equipment, and which is operative in a dual capacity with each receipt of an incoming impulse thereafter. Generally speaking, the operations of this relay may be considered as comprising (*a*) a triggering operation in which the said relay effects triggering of the impulse generating relays whenever an incoming impulse is received over the incoming line, and (*b*) a timing operation in which said relay operates with the other two impulse generating relays subsequent to each triggering action to serve as a timer relay in determining the characteristics of the corrected outgoing impulse.

Briefly, the trigger relay (60) follows the line relay (20) of the arrangement and with each release thereof responsive to receipt of an incoming impulse controls the operation in a given sequence of the other two timer relays. The other two timer relays (40 and 50) operate in the given sequence, and further the sequence by effecting reoperation of the trigger relay (60), which, in turn, controls release of the first two timer relays (40 and 50) in the order in which they were operated. The sequence is as follows: line relay 20 releases, trigger relay 60 releases, timer relay 40 operates, timer relay 50 operates, trigger relay 60 reoperates, timer relay 40 releases, timer relay 50 releases. However, if the line relay 20 is still in the released condition when relay 40 has released, the release of timer relay 50 is delayed by line relay 20.

The new and novel arrangement set forth herein includes four outgoing circuits over which corrected pulses of predetermined durations are transmitted with each sequence operation of the timer relays.

Briefly, transmission of an outgoing pulse is initiated in the first outgoing circuit (designated "To F Relay" and extending over conductor 76) as the trigger relay 60 releases in a sequence, and is terminated as the timer relay 50 releases in that sequence, the length of the pulse being determined by the operate time of the initial timer relay 40, the operate time of the second timer relay 50, the operate time of the trigger relay 60, and the release times of the two timer relays 40 and 50. This pulse will be lengthened whenever line relay 20 delays the release of relay 50.

Transmission of an outgoing pulse is initiated in the second outgoing circuit, designated "To Counting Chain" and extending over conductor 77, as the first timer relay 40 operates in the sequence and is terminated as that relay releases. The length of the pulse in this circuit is determined by the operate time of the second timer relay 50, the operate time of the trigger relay 60 and the release time of the first timer relay 40. The holding action which line relay 20 may impose upon relay 50 in the event of the receipt of a lengthened incoming impulse does not alter the length of the outgoing impulse in this circuit.

The pulse in the third outgoing circuit extending over conductors 78 and 79 and designated "To Repeater," is of the same duration as that in the second outgoing circuit described above, but effects loop control rather than the extension of ground for control purposes.

The pulse in the fourth outgoing circuit extending over conductors 80 and 81 and designated "To Repeater," is initiated as the second timer relay 50 operates, and is terminated as the second timer relay 50 releases, the length of this pulse being determined by the operate time of trigger relay 60 and the release time of relays 40 and 50. The duration of impulses generated in this circuit vary with the duration of the incoming impulse in the manner of the impulses generated in the first outgoing circuit of this arrangement.

Upon release, an extraneous pulse is transmitted in the first three circuits but not in the fourth.

The above described arrangement in which one of the timer relays is effective in the determination of the duration of the outgoing corrected impulses, as well as the triggering of the impulse generation, provides a system in which output impulses of various values extending over a wide range are provided with a minimum number of relays.

*Specific description*

With reference now to the drawing the novel impulse corrector arrangement as shown thereat is adapted for use with the switching equipment set forth in the automatic telephone system disclosed in the application directed to "Automatic Telephone System," which is identified by Serial No. 161,677 and which was filed May 12, 1950, by Arne Oxaal, and assigned to the assignee of this invention. The equipment is also adapted for operation with selector common control equipment, and as evidenced by the notations in the drawings, for use with trunk repeating equipment. Other uses will be obvious to parties skilled in the art.

In establishing a call in conventional automatic telephone systems, the subscriber removes his handset from the substation unit to complete an energizing circuit for an associated line circuit. The line finder circuit operates, and as an idle finder-selector link is located, the subscriber circuit is extended to the line relays of the seized selector switch. Equipment in the finder-selector switch arrangement automatically acts to busy the calling line to the other automatic switches having access thereto. Timing means associated with the finder-selector switch provide a given predetermined time interval following seizure of the link, in which the party may initiate the dialling operation to extend the call to a further point in the exchange equipment.

In the drawing, such line finder arrangement is shown in schematic form as being connected to the incoming side of the novel impulse correcting arrangement, which may be a part of a selector switch in an automatic telephone exchange. A pair of impulsing contacts 1 are representative of the dial transmitting contacts of a subscriber dial, and, with the conductors 2 and 3, are representative of the seizing circuit extended over the line finder to the selector as a call is initiated. Line relays 10 and 20, which may be the line relays of the selector switch, are connected to be responsive to the combined seizing and impulsing circuit. A hold relay 30 responds to the initial operation of the line relays 10 and 20 and is slow to release, whereby it holds operated during the receipt of a series of impulses representing a digit.

A trigger relay 60 (which also functions as a timer relay in the sequence) and a pulse hold relay 70 are also operative on seizure to prepare the impulse corrector outgoing circuits to the selector counting chain, to the transfer relay "F," and to outgoing loop pulsing circuits.

The timer relay set includes an initial sequence relay 40, a second sequence relay 50, and the trigger relay 60. With each restoration of the trigger relay 60, the operation in sequence of relays 40, 50, and 60, followed by the release of relays 40 and 50 is effected.

Contacts on these timer relays are connected to control the transmission of impulses over the outgoing impulsing circuits, the first outgoing circuit extending to the so-called "F" relay of the selector. The selector "F" relay is normally arranged to be operated on seizure of the selector, or on reception of the first impulse, and to be held in such condition during the receipt of each incoming digit transmitted by the subscriber. The relay is arranged to be restored following termination of receipt of each digit and to control extension of the calling line to the next switch of the series.

In conventional selector circuits an operating circuit is completed to the "F" relay with each deenergization of the line relay as an incoming digit is received. Since the "F" relay is of the slow-to-release type, it will remain in the operated position during the make period of each of the received impulses representing the energizing digit. It is apparent therefrom that in a conventional selector with the receipt of an extra long make period (i. e., one longer than the hold period of the "F" relay), the "F" relay will restore and the selector will switch through before the digit is completely received. The first circuit herein is arranged to receive outgoing impulses from the corrector which are of such value as to prevent such occurence.

With reference now to the drawings and the following description, the manner of operation of the novel impulse correction circuit of the invention in providing impulses of these predetermined characteristics and others in response to receipt of impulses of varied characteristics will become apparent.

With the initial closure of contacts 1, a seizing circuit is extended over conductors 2 and 3 to the line relays 10 and 20 of the switching equipment to effect the series operation thereof. Impulse relay 10 is effective in its operation to control various units in the associated switching equipment which are not pertinent to the present disclosure, and accordingly have not been shown hereat. Line relay 20 also serves other functions in the switching equipment, but only the pertinent control circuits are shown. Line relays 10 and 20 operate and line relay 20, at its contacts 21, completes an operating circuit for the hold relay 30 (negative battery, winding of relay 30, contact 21 to positive battery); at its contact 22 prepares a point in the holding circuit for trigger relay 60, and its contacts 23 interrupts a point in a holding circuit for pulse termination relay 50 (presently inoperative).

Hold relay 30 operates, and at its contact 31 closes a master ground circuit, to prepare a point in the holding circuit for the pulse termination relay 50; to prepare a point in the holding circuit of relay 60; and to complete an operating circuit for the trigger relay 60, which extends from battery over the winding of relay 60, contacts 72 and 31 to ground.

Trigger relay 60 operates, and at its contacts 61 interrupts a point in the operating circuit for the first pulse control relay 40 to prevent the operation thereof responsive to seizure of the correction circuit; at its contacts 62 completes a self-holding circuit which extends over contacts 22 and 31 to positive battery; at its contact 63 completes an operating circuit for the pulse hold relay 70 (negative battery, winding of relay 70), contacts 63 and 31 to positive battery), and at its contacts 65 opens a point in the pulsing circuit to the "F" relay.

Pulse hold relay 70 operates and at its contacts 72 interrupts the initial operating circuit for the trigger relay 60, at its contacts 71 provides a locking circuit for itself and prepares an operating circuit for the sequence timer relay 40; at its contacts 73 prepares the first outgoing impulsing circuit (in this example the operating circuit for the "F" relay of the associated switch); at contacts 73 prepares the second outgoing impulsing circuit for impulse transmission which extends to the selector counting chain; and at contacts 74 and 75 closes the loop circuits extending over conductor pair 78 and over conductor pair 79 and 80, 81 respectively.

Thus with seizure of the equipment by a substation such as indicated by contacts 1, over the loop comprising conductors 2 and 3; the line relays 10 and 20, circuit hold relay 30, trigger relay 60 and pulse hold relay 70 are energized and maintained in the operated condition pending receipt of the operating impulses from the subscriber substation.

As the incoming circuit is interrupted by the dial contacts 1 in the transmission of the first impulse, the energizing circuit for the line relays 10 and 20 is interrupted and the relays are responsively restored. Line relay 20 at its contacts 21 interrupts the energizing circuit for the hold relay 30; at its contacts 22 interrupts the holding circuit for the trigger relay 60; and at its contacts 23 prepares a holding circuit for the timer relay 50, and also closes a new holding circuit for relay 30 through contact 53 of relay 50.

Trigger relay 60 restores to set off the timer relays in a given predetermined operating sequence, whereby the transmission of corrected pulses over the outgoing pulsing circuits is effected.

Specifically, with restoration of the trigger relay 60 and closure of the associated contacts 61, an energizing circuit is completed to the initial sequence relay 40 of the pulse timer relay set. Trigger relay 60 at its contacts 62 opens a further point in its holding circuit, and at its contacts 65 closes the outgoing pulsing circuit to the "F" relay of the associated selector equipment.

Initial sequence relay 40 at its contacts 42 completes an obvious operating circuit for the second sequence relay 50; at its contacts 43 completes the second outgoing pulsing circuit which extends to the selector counting chain for the transmission of the off-normal period of the first pulse thereover; and at its contacts 44 initiates transmission of a pulse in the first repeater loop circuit extending over conductors 78 and 79.

The hold relay 30 for the circuit is slow to release and will normally hold up during the open period of the incoming impulses. As an aid to holding during receipt of impulses having extra long breaks, contact 41 on the first sequence relay 40 completes an auxiliary holding circuit for relay 30.

The second sequence relay 50 operates over the obvious energizing circuit completed by contacts 42, and at its contacts 51 completes a self-holding circuit which extends under the control of the line relay 20, the circuit extending from negative battery over the winding of relay 50 and contacts 51, 23, and 31 to positive battery. Second sequence relay 50 at its contacts 52 completes an operating circuit for the trigger relay 60 which in its responsive operation becomes a part of the sequence set for pulse determination purposes; at its contacts 53 opens its pulse circuit to relay 30; at its contacts 54 connects further ground to the first outgoing pulsing circuit, and by the opening of its contacts 56 initiates transmission of a pulse in the outgoing repeater loop circuit extending over conductors 80 and 81.

Trigger relay 60 now operates in the sequence, and at its contacts 61 interrupts the energizing circuit for the initial sequence relay 40, at its contacts 62 prepares a self-holding circuit to be controlled by line relay 20; and at its contacts 65 interrupts application of ground to the first outgoing impulse circuit at that point. The outgoing impulse is continued by reason of the ground application at contacts 54 on the second sequence relay 50.

The initial sequence relay 40 restores slowly and at its contacts 41 interrupts the application of ground to the hold relay 30; at its contacts 42 interrupts the energizing circuit for the second sequence relay 50; at its contacts 43 interrupts the application of ground to the second outgoing impulsing circuit, thus terminating the outgoing impulse being transmitted thereover, and at contacts 44 recloses the loop circuit extending over conductors 78 and 79 to terminate the pulse transmission thereover.

If the line relay 20 has not been reoperated by receipt of the make portion of the impulse at this time, the second sequence relay 50 will be maintained operated by the holding circuit extending over contacts 51, 23, 31 to ground until such time as the line relay 20 is reenergized.

If, however, the line relay 20 has already energized as the initial sequence relay 40 restores, such holding circuit will be interrupted at open contacts 23 and the circuit of the second sequence relay 50 will be opened immediately and slow release relay 50 will release.

With the restoration of the second sequence relay 50, contacts 51 are opened to interrupt a further point in its self-holding circuit, contacts 52 are opened to interrupt a point in the energizing circuit for the trigger relay 60, contacts 54 interrupt the application of ground to the first outgoing pulsing circuit to terminate the transmission of the first outgoing pulse thereover, and contacts 56 close to terminate the first outgoing pulse in the loop circuit extending over conductors 80 and 81. The second sequence relay 50 in its restoration thus terminates the transmission of the pulse in the first and fourth outgoing circuits.

Although the operating circuit for trigger relay 60 is interrupted by the opening of contacts 52 with the restoration of timer relay 50, it is noted that the timer relay 50 will not restore until such time as the line relay 20 has operated. Accordingly a holding circuit for the trigger relay 60 is always completed over contacts 62, 22, and 31 to ground and the trigger relay 60 is prepared (or cocked) for operation with receipt of a subsequent incoming impulse prior to termination of the previous outgoing impulse.

Additional contacts on the timer relays may be connected to produce impulses of other duration to control other circuits in the switches. For example, contact 41 of relay 40 and contact 53 of relay 50 provide pulses of ground to support the operation of slow release relay 30 while the line 20 is released during a pulse. The slow release of relay 40 aids in the alleviation of a somewhat critical operating condition which relay 30 approaches with the occurrence of long pulses at slow speeds. The critical condition which might normally result from such occurrence is further alleviated in the present arrangement by the extension of one of the energizing circuits for relay 30 over the break contacts 23 of relay 20 and the break contacts 53 of relay 50.

It is apparent from the foregoing description that the trigger relay 60 is involved in the timing of the duration of the outgoing corrected impulses, and is additionally maintained in the energized condition following transmission of such outgoing pulses, whereby it is prepared for its function as a trigger relay for the sequence set as the next incoming pulse is received.

It is also apparent from the foregoing description that the impulse transmitted over the first outgoing circuit is initiated with the release of the trigger relay 60 and is terminated with the release of the second sequence relay 50. The release of the timer relay 50 in this modification is in turn partially dependent upon the nature of the incoming impulses; that is, in the event that the incoming impulse has a shorter than normal break period, the line relay 20 will be operated as the energizing circuit for the second sequence relay 50 is opened, and in such event the outgoing impulse over the first outgoing circuit will be terminated with the release, in its regular cycle, of the second sequence relay 50. The duration of the outgoing impulse over the first impulsing circuit is thus determined by the time required for operation of the initial sequence relay 40, the operating time of the timer relay 50, the operating time of the trigger relay 40, and the release time of the timer relay 60, the release time of the timer relay 50.

In the event that 60% pulses at 10 pulses per second are being fed to the impulse corrector by contacts 23 and 22 of line relay 20; contacts 42 of relay 40, and contacts 23 of relay 20 open approximately simultaneously, and line relay 20 will effect no holding action on relay 50.

In the event that the incoming impulse has a break period of longer than normal duration, the line relay 20 will be in the restored condition as relay 40 restores and at its contacts 42 opens the circuit of relay 50. Relay 50 will therefore be maintained energized over the holding circuit extending from negative battery over the winding of relay 50, contacts 51, 23 and 31 to ground. The outgoing impulses in the first outgoing circuit which are extended over the conductor 76 to relay F will thus be lengthened beyond the established minimum impulse length by an amount which is determined by the duration of the break period of the incoming impulse which occurs subsequent to the release of relay 40.

It is apparent that the duration of an outgoing pulse as transmitted over the outgoing circuit extending over conductors 78 and 79 is independent of the duration of the incoming pulse, its length being determined by the operation and release of relay 40, or consisting of the combined operating times of relays 50 and 60 and the release time of relay 40.

The duration of an outgoing pulse over the outgoing circuit extending over conductors 80 and 81 is determined by the operation and release of relay 50, which with receipt of longer than normal incoming pulses releases under control of line relay 20. Thus with receipt of a shorter than normal pulse, the duration of the outgoing pulse is determined by the operating time of relay 60 and the release time of relays 40 and 50.

It is also apparent that the length of the impulse transmitted over the outgoing circuit extending over conductor 77 to the counting chain, is initiated with the operation of the initial sequence relay 40 and is terminated with the subsequent release of the same relay 40. Thus the duration of the impulse transmitted over the second outgoing circuit is of constant length, consisting of the operating time of relays 50 and 60, and the release time of relay 40, independent of the length of the incoming pulse. It is, of course, apparent that in pulsing a counting chain of relays, it is desirable to transmit, repeatedly, impulses of a given length.

Upon termination of the outgoing impulse, the line relays 10, 20, hold relay 30, and trigger relay 60 and pulse hold relay 70 are in the operated condition. Such condition prevails during the make period of the next incoming impulse. With receipt of the break portion of the second impulse, the line relays 10 and 20 restore to effect interruption at contacts 22 of the holding circuit for the trigger relay 60, which restores to set off the relay timing sequence for generation of a second outgoing impulse.

Operation of the impulsing circuit in this manner continues responsive to receipt of the digit-constituting impulses over the incoming circuit.

Following receipt of the make portion of the last incoming pulse of a digit, line relays 10 and 20, hold relay 30, trigger relay 60 and pulse hold relay 70 are held in the operated condition.

The action of the circuit for succeeding digits is obvious.

Restoration of the circuit is effected with release of line relays 10 and 20 responsive to interruption of the incoming line circuit at contact 1 (or at other contacts not shown). Line relay 20 restores, and at its contacts 22 opens the holding circuit for trigger relay 60, which releases to cause relays 40, 50, and 60 to go through a cycle of operation, that is, relay 40 operates, relay 50 operates, relay 60 operates, relay 40 releases, and relay 50 remains locked through contacts 51, 23, and 31 to ground. Line relay 20 does not re-energize, and accordingly relay 50 remains locked up and at its contacts 53 holds open the operating circuit for relay 30. Since relays 20 and 40 are in the restored condition at this time, the further holding circuits for relay 30 controlled by contacts 21 and 41 are also open, and relay 30 presently releases to open the energizing circuits for relays 50, 60, and 70. Relays 60 and 70 restore immediately. Relay 50 being of the slow release type restores after an interval. This may be summarized diagrammatically as follows, in which a non-circled numeral indicates relay operation, a circled numeral indicates relay release, and a wavy line indicates delay in releasing due to slow to release characteristics.

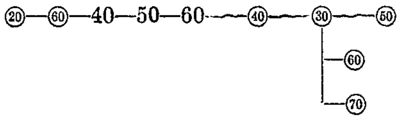

From the foregoing, it can be seen that with termination of receipt of an incoming digit, no extra pulse is transmitted over the loop extending over conductors 80 and 81. That is, with the operation of relay 50, the loop is opened at a first point and with the subsequent release of relay 70, the loop is opened at a second point. Consequently the subsequent release of relay 50 does not reclose the loop, and the transmission of an extra pulse over the loop on release of the equipment is prevented.

The impulse corrector arrangement of the foregoing disclosure is operative to provide simultaneously a first set of break pulses of constant length, and a second set of pulses which are of longer duration whenever the incoming pulse is elongated. The provision of a set of impulses of the first type is of considerable importance when the pulses are utilized to drive counting chains, or are repeated over and over again by a chain of impulse-correctors, as in an area having extended dialling or certain types of toll dialling networks. The latter impulse set is important, of course, in maintaining such relays as the "F" selector relay operated for longer periods of time as conditions require. The provision of an outgoing circuit in which there is no extra impulse transmitted with release of the equipment is requisite of the desired operation of an interconnected repeater circuit in some circuits.

Through this arrangement certain timing periods which in automatic telephone switching apparatus have been critical heretofore are now eliminated and an improved type of service is obtainable therewith.

While we have illustrated and described what is regarded as the preferred embodiment of the invention, nevertheless it will be understood that such illustration is merely exemplary and that numerous modifications may be made therein without departing from the essence of the invention.

What is claimed is:

1. An impulse correcting arrangement for providing a corrected outgoing impulse for each impulse received over an incoming line comprising a set of timer relays connected to operate in a given cyclic sequence responsive to triggering of the set, at least a first and a second outgoing circuit, a first impulse generating means connected in said first circuit controlled by said timer relay set in each cycle to transmit thereover an impulse of a predetermined length independent of the duration of the incoming pulse, and a second impulse generating means connected in said second circuit controlled by said timer relays to transmit in said same cycle an impulse of a variable length as determined by the length of the corresponding incoming impulse.

2. An impulse correcting arrangement for providing a corrected outgoing impulse for each impulse received over an incoming line by interconnected receiver means, said impulse correcting arrangement comprising a set of three timer relays connected to operate in a given cyclic sequence responsive to triggering thereof, at least a first and a second outgoing circuit, a first set of contact means connected in said first circuit controlled by said timer relay set in each of its cycles to transmit thereover an impulse of a predetermined length independent of the duration of the incoming impulse, and a second set of contact means connected in said second circuit controlled by said timer relays to transmit in said same cycle an impulse of a given minimum length, and contact means operatively controlled by said receiving means for extending the impulse generated in said second circuit responsive to receipt of an incoming impulse of greater than a given normal length.

3. An impulse correcting arrangement for providing a corrected outgoing impulse for each impulse received over an incoming line by connected receiver means, said impulse correcting arrangement comprising a set of three timer relays connected to operate in a given sequence responsive to energization thereof to generate timed outgoing impulses in at least a first and a second outgoing circuit, circuit means for connecting one of said timer relays for operation by said receiver means with each receipt of an incoming impulse to initiate said relays to operate in said cyclic manner, circuit control means for connecting said one relay for reoperation in each cycle of said timer relays in said timing operations, a first impulse generating means connected in said first circuit controlled by said timer relay set in each cycle to transmit thereover an impulse of a predetermined length independent of the duration of the incoming pulse, a second impulse generating means connected in said second circuit controlled by said timer relay set to transmit in the same cycle an impulse of a given minimum length, and contact impulse generating means controlled by said receiver means operative to extend the duration of the outgoing impulse in said second circuit responsive to receipt of an incoming pulse of greater than a given normal length.

4. An impulse correcting arrangement for providing a corrected impulse to connected repeater equipment for each impulse received over the incoming circuit, said arrangement comprising a set of timer relays connected to operate in a given cyclic sequence responsive to energization thereof, at least a first circuit for connecting the output of said timer relay set to the repeater to operate same to repeat the digit representing impulses, and a second circuit for providing impulses to said repeater to maintain the transfer relay of said repeater operated during receipt of the impulses representing each received digit, a first impulse generating means connected in said first circuit controlled by said timer relay set in each cycle to transmit thereover an impulse of a predetermined length independent of the duration of each incoming impulse, and a second impulse generating means connected in said second circuit controlled by said timer relay set to transmit in the same cycle an impulse of at least a given minimum length and of a maximum length which is determined by the length of the corresponding incoming impulse.

5. An impulse correcting arrangement for providing a corrected impulse to connected equipment for each impulse received over an incoming circuit, said arrangement comprising a set of three timer relays connected to operate in a given cyclic sequence responsive to each energization thereof, at least a first, second, third and fourth outgoing circuit for extending impulses to said interconnected equipment, a first impulse generating means connected in said first circuit controlled by said timer relay set to transmit thereover in each cycle an impulse of at least a given minimum length as determined by the operate time of said three relays and the release time of the first and second relays, a second impulse generating means connected in said second outgoing open circuit controlled by said timer relay set to transmit in the same cycle an impulse of a predetermined length independent of the corresponding incoming impulse as determined by the operate time of said second and said third relay and the release time of said first relay, a third impulse generating set connected in said third outgoing closed loop circuit controlled by said timer relay set to transmit thereover in each cycle an impulse of a predetermined length independent of the duration of the corresponding incoming impulse as determined by the operate period of said second and said third relay and the release time of said first relay, and a fourth impulse generating set connected in said fourth outgoing circuit controlled by said timer relay set to transmit thereover in each cycle an impulse of at least a given minimum length as determined by the operating time of said third relay and the release period of said first and second relays.

6. An impulse correcting arrangement as set forth in claim 5 which includes receiving means operative responsive to each of said incoming impulses, and impulsing means controlled by said receiving means to extend the length of the outgoing impulse generated in said first and said fourth circuits with receipt of a corresponding impulse of greater than a given normal length.

7. An impulse correcting arrangement for providing a corrected outgoing impulse for each incoming impulse received by connected receiver means, said impulse correcting arrangement comprising a set of three timer relays connected to operate in a given cyclic sequence, circuit means for connecting one of said timer relays for operation by said receiver means with each receipt of an incoming impulse to initiate said timer relays in said cyclic operation, release means for rendering the other two of said timer relays slow to release with interruption of their energizing circuit, at least a first and a second outgoing circuit, a first set of contact means connected in said first circuit controlled by said timer relay set in each of its cycles to transmit thereover an impulse of a predetermined length as determined by the operating characteristics of said relays independent of the duration of the incoming impulse, and a second set of contact means connected in said second circuit controlled by said timer relay set to transmit in said same cycle an impulse of a given minimum length.

8. An arrangement as set forth in claim 7 which includes means controlled by said receiver means to extend the duration of the outgoing pulse over said second circuit with receipt of an incoming pulse of longer than a predetermined length, and in which said second set of contact means is controlled to transmit impulses of a duration determined at times by the operate time of said three relays and the release time of said two slow to release relays, and at other times by the operate period of said three relays, and the release period of said two slow to release relays plus the period said incoming impulse extends beyond the release of the first of said slow to release relays.

9. An arrangement as set forth in claim 7 in which said first contact means are connected to be operated to provide impulses of a length as determined by the operate time of one of said slow to release relays, and operate time of said trigger relay and the release time of one of said slow to release relays.

10. An arrangement as set forth in claim 4 in which said timer means comprises a set of three relays and means for rendering two of said relays slow to release, and in which said first impulse generating means is connected to be operated to provide outgoing impulses over said first circuit of a length determined by the operate time of one of said slow-to-release relays, the operate time of said trigger relay, and the restoring time of said other slow to release relay, and in which said second impulse generating means is connected to provide outgoing impulses over said second circuit of a minimum length determined by the operate time of said three time-relays and the release time of said two slow to release timer relays.

11. An impulse correcting arrangement for providing corrected outgoing impulses for each incoming impulse received by connected receiver means, said impulse correcting arrangement comprising a set of three timer relays connected to operate in a given cyclic sequence, release means for rendering two of said timer relays slow-to-release with interruption of their energizing circuit, an output circuit, circuit completing means for connecting one of said timer relays for energization as a trigger relay for the sequence, circuit control means for connecting said trigger relay in said sequence for re-operation therewith after triggering to determine the length of the outgoing impulse, and contact means controlled by said sequence set of relays for effecting an outgoing impulse of a length determined by the operation and release periods of said slow to release relays plus the time of operation of said trigger relay.

12. An impulse correcting arrangement for providing a corrected outgoing impulse for each incoming impulse received by connected receiver means, said impulse correcting arrangement comprising a set of three timer relays connected to operate in a given cyclic sequence, release means for two of said timer relays operative to effect a given delay in the release thereof with interruption of their energizing circuit, an output circuit, circuit completing means for connecting one of said timer relays for energization as a trigger relay for the sequence, circuit control means for connecting said trigger relay in said sequence for re-operating therewith after triggering to determine the length of the outgoing impulse, and contact means controlled by said sequence set of relays for effecting an outgoing impulse of a length determined by the time of operation of said trigger relay and the release periods of said slow to release relays.

13. An impulse correcting arrangement for providing a corrected outgoing impulse for each incoming impulse received by connected receiver means, said impulse correcting arrangement comprising a set of three timer relays connected to operate in a given cyclic sequence, release means for two of said timer relays operative to effect a given delay in the release thereof with interruption of their energizing circuits, an output circuit, circuit completing means for connecting one of said timer relays for energization as a trigger relay for the sequence, circuit control means for connecting said trigger relay in said sequence for reoperation therewith after triggering to determine the length of the outgoing impulse, and contact means controlled by said sequence set of relays for effecting an outgoing impulse of a length determined by the time of operation of two of said relays and the release period of one of said slow-to-release relays.

References Cited in the file of this patent

UNITED STATES PATENTS

| | | |
|---|---|---|
| 1,589,409 | Miller | June 22, 1926 |
| 2,500,289 | Kessler | Mar. 14, 1950 |
| 2,629,018 | Wicks | Feb. 17, 1953 |